Figure 1:
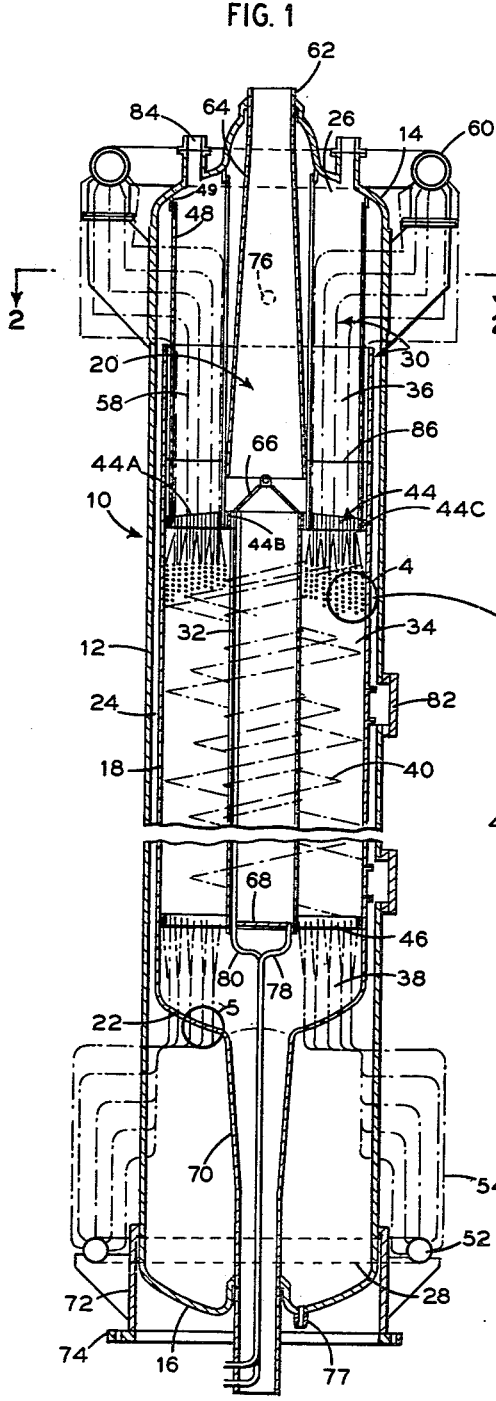

Dec. 3, 1963  J. SCHLICHTING ETAL  3,112,735
LIQUID METAL HEATED VAPOR GENERATOR
Filed March 30, 1959  2 Sheets-Sheet 1

INVENTORS
John Schlichting
Theodore S. Sprague
BY *J. Moran*
ATTORNEY

United States Patent Office 3,112,735
Patented Dec. 3, 1963

3,112,735
LIQUID METAL HEATED VAPOR GENERATOR
John Schlichting, Akron, and Theodore S. Sprague, Hudson, Ohio, assignors to The Babcock & Wilcox Company, New York, N.Y., a corporation of New Jersey
Filed Mar. 30, 1959, Ser. No. 802,880
10 Claims. (Cl. 122—32)

This invention relates in general to a vapor generator and more particularly to a vapor generator utilizing a heated liquid metal as the source of heat.

The use of a heated liquid metal as the heat source in a vapor generator is well-known. Vapor generators using mercury have been used for many years and more recently sodium bismuth and NaK, a compound of sodium and potassium, have found favor as heating fluids. In vapor generators employing the last three mentioned metals, and particularly sodium, special precautions are necessary to avoid the possibility of violent interaction of water and the heated liquid metal. To guard against this danger a double tube arrangement has been used to provide an annular flow space through which a third fluid can be passed to act both as an intermediate heat transfer fluid and as a monitoring fluid to detect leaks between the water and liquid sodium circuits.

In vapor generators presently using heated liquid metals, liquid metal flow stratification has produced pronounced temperature unbalances which result in differential thermal stresses in the shell of the vapor generator.

It is an object of the present invention to provide a vapor generator in which heated liquid metal can be used as the heating medium while providing adequate safety provisions in the event of the interaction of heated liquid metal and water. In addition, the construction of the vapor generator avoids the problem of flow stratification and the resultant differential thermal stressing of the generator shell.

The present invention thus provides a heat exchanger comprising a pressure vessel having a container arranged therein. The container is spaced from the walls and heads of the vessel, thereby forming a continuous gas space which completely envelops the container. A bundle of helically wound heat exchange tubes is disposed within the container for the flow of a first heat transfer fluid therethrough. Means are provided to supply a second heat transfer fluid to the container for countercurrent flow thereabout in heat exchange relationship with the first fluid. In addition, means are also provided for supplying a gas to the gas space.

Additionally, the container disposed within the pressure vessel may have a relatively thin wall as compared with the pressure vessel wall and it is arranged so the flow is confined within this thin walled container and so it does not come in contact with the heavier walls of the pressure vessel. In this way severe temperature gradients are avoided in the pressure vessel. Further, inert gas within the gas space, which completely envelops the container, provides a cushioning effect for any pressure surge resulting from a tube failure and the subsequent interaction of water and the heated liquid metal.

In addition, the helically coiled tubes are wound about a central core within the container. The tubes are disposed in a number of concentric, vertically arranged circular layers. Each tube is positioned within one of these circular layers and has its pitch and coil diameter proportioned such that each tube within the bundle will be of substantially equal length. The tubes are spaced from one another so that the liquid metal may flow thereabout.

Furthermore, the present invention is particularly adaptable for use as a once-through vapor generator.

The vertically arranged, helically coiled tube bundle permits high liquid-side mass flow which minimizes the possibility of rapid corrosion resulting from extreme tube wall temperature fluctuations associated with the transition from nucleate to film boiling. The equal length, helically wound, tube arrangement produces uniformly-superheated vapor and provides sufficient heat transfer surface without excessive tube bundle length.

The various features of novelty which characterize the invention are pointed out with particularity in the claims annexed to and forming a part of this specification. For a better understanding of the invention, its operating advantages and specific object attained by its use, reference should be had to the accompanying drawings and descriptive matter in which we have illustrated and described a preferred form of the invention.

Figure 2:
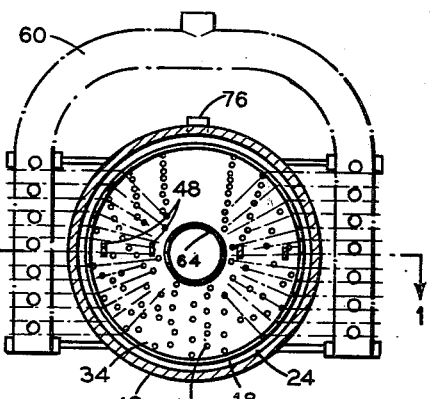
Figure 4:
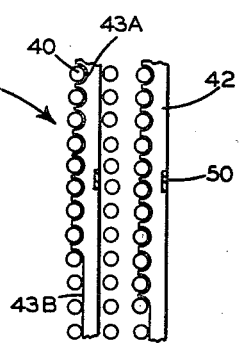
Figure 5:
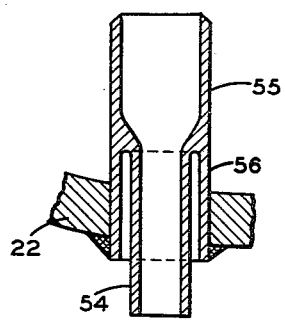
Figure 3:
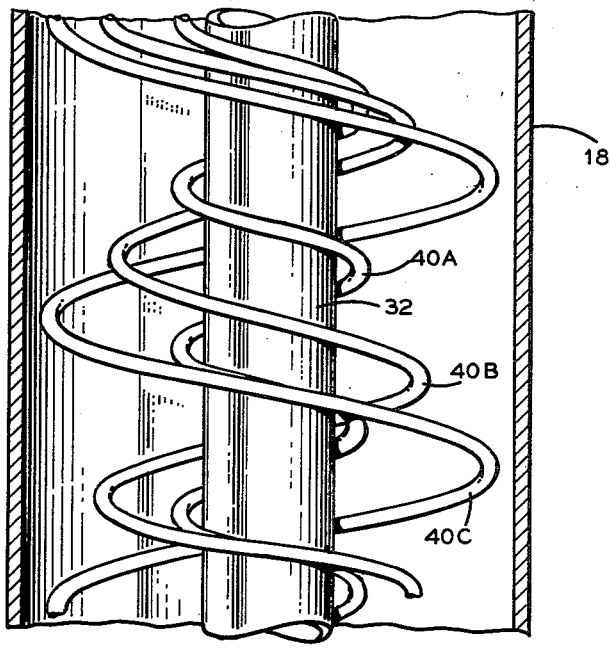

Of the drawings:
FIG. 1 is a vertical cross-sectional view of a vapor generator which embodies this invention taken along line 1—1 of FIG. 2;
FIG. 2 is a horizontal cross-sectional view taken along the line 2—2 of FIG. 1;
FIG. 3 is a schematic view showing a typical arrangement of the helically wound tubes in this invention;
FIG. 4 is an enlarged sectional view of the encircled portion of the tube bundle designated by the numeral 4 in FIG. 1; and
FIG. 5 is a greatly enlarged vertical cross-sectional view of the encircled portion designated by the numeral 5 in FIG. 1.

Referring now to the drawings, FIG. 1 shows a vertically elongated cylindrical shell 12 having top and bottom generally elliptically shaped heads 14, 16, respectively, which form a pressure vessel 10. A cylindrically shaped container 18 with an open upper end 20 and a closed elliptically shaped lower end 22 is located within the pressure vessel 10 concentric with its vertical axis. The wall thickness of the container 18 is considerably less than that of the shell of the pressure vessel 10.

The container 18 is closely spaced laterally from the pressure vessel shell 12 to form a narrow annular space 24 between the container and the shell. In addition the container is arranged along the vertical axis of the pressure vessel so that open spaces 26, 28 of considerable volume are provided between the upper and lower ends 20, 22 of the container and the heads 14, 16 of the pressure vessel. These open spaces 26, 28 in combination with annular space 24 form a continuous gas space 30 which completely envelopes the container.

A conduit 32 is arranged within the container 18 concentric with the vertical axis of the pressure vessel 10. The conduit 32 is circular in cross-section and has a diameter roughly one-third that of the container 18 so that an annular shaped chamber 34 is formed between the conduit and the container. The vertical dimension of the conduit 32 is less than that of the container 18 and the conduit is arranged to provide an upper and a lower open space 36, 38 within the container at either end of the conduit.

A bundle of closely spaced, helically wound tubes 40 is arranged within the annular shaped chamber 34 and coiled about the conduit 32. The vertical height of the bundle of tubes 40 is approximately equal to and extends for the length of the conduit 32. The tubes 40 are disposed in a number of concentric, vertically arranged circular layers. Each of the tubes 40 is helically wound in one of these circular layers, as for example 40a, 40b and 40c in FIG. 3, with the pitch of the helix increasing as the diameter of the circular layers increases. In this manner, by properly correlating the diameter and pitch, each tube 40 within the bundle may be made substantially equal in length and fluid entering any of the tubes will have the same length of flow path through the tube bundle. This permits a fluid, passing in heat exchange relationship through any of the flow paths within the tube bundle, to receive or to give up substantially equal amounts of heat regardless of the flow path it takes.

In FIG. 4 there is shown the support arrangement for the tubes 40 within the annular shaped chamber 34. The bundle of helically coiled tubes 40 is suspended from the top head 14 of the pressure vessel by means of vertically arranged support members 48 which are attached to support lugs 49 welded to the head. The bundle of tubes floats within the container 18. It is not attached to the container.

An upper carrying member 44 is attached to the lower end of the support member 48. The upper carrying member 44 is located at the upper end of the conduit 32 in a plane transverse to the vertical axis of the pressure vessel and is made up of a number of radially arranged arms 44A which extend between and are attached to an inner and an outer ring 44B, 44C. The inner ring 44B fits about the conduit 32 and the outer ring 44C fits within the container 18. These rings are closely spaced from the members they adjoin so that they may move relative thereto. A lower carrying member 46 having substantially the same structural arrangement as the upper carrying member is positioned at the lower end of the conduit 32 and may also move in relation to the conduit and the container.

A number of vertically disposed hanger bars 42 are attached at their upper and lower ends respectively to the upper and lower carrying members 44, 46. These hanger bars 42 are arranged so that their longer sides are positioned in a radial plane with respect to the pressure vessel. The inner edge of the hanger rod is cut away to provide alternately a section of scalloped indentations 43A and a section of straight indentations 43B, each section having substantially the same length. Every other coil of the helically coiled tubes are supported by the scalloped indentations 43A. The straight indentations 43B do not offer any support to the tubes 40 and thereby permit movement due to differential expansion between the tubes 40, the hanger rods 42 and the shell 12 of the pressure vessel. The opposite edge of the hanger bars is not indented and is very closely spaced from the adjoining layer of tubes 40. Each circular layer of tubes 40 has a number of the hanger bars 42 disposed along its outer periphery with the hanger bars supporting adjoining layers of tubes spaced 30° apart. Horizontally arranged tie rings 50 are located at vertically spaced positions along the hanger bars to maintain them in position and alignment.

A U-shaped first-fluid inlet header 52 is arranged exteriorly about the lower portion of the pressure vessel. Fluid inlet tubes 54 are connected at their lower ends to the opposing legs of the first-fluid inlet header 52 and then extend first upwardly and then inwardly passing through the shell 12 of the pressure vessel 10 at a point below the container 18. A thermal sleeve is provided about each inlet tube 54 as it passes through the shell to keep it out of contact with the shell. After passing through the shell the inlet tubes 54 are again bent upwardly passing through the lower end of the container where they are connected to a transition fitting and thermal sleeve combination 55 (see FIG. 5). A thermal sleeve 56 is provided about each of the inlet tubes where they pass through the container. This thermal sleeve prevents the development of severe temperature gradients in the walls through which the tubes pass and thereby keeps the differential thermal stresses within allowable limits. The thermal sleeve 56 is integrally joined to the transition fitting and thermal sleeve combination 55.

The inlet tubes 54 have a smaller diameter than the helically coiled tubes 40 and thereby provide sufficient flow resistance to maintain stable flow through the pressure vessel. The transition fitting and thermal sleeve combination 55 is located between each of the inlet tubes 54 and the lower ends of the helically coiled tubes 40 to supply the necessary transition from one size tube to the other.

At the upper end of the bundle within the annular shaped chamber 34, outlet tubes 58 are connected to the helically coiled tubes 40 and extend upwardly generally parallel with the vertical axis of the pressure vessel. The outlet tubes 58 extend upwardly to a point above the top of the container where they are bent into a horizontal plane and pass through the shell 12 of the pressure vessel. At the point where the tubes pass through the pressure vessel shell a thermal sleeve is provided to separate the tube from the shell. Once outside the pressure vessel the tubes are bent back into a vertical position and extend upwardly to a point where they are connected to a first-fluid outlet header 60. The first-fluid outlet header 60 (see FIG. 2) is U-shaped and is arranged in a plane parallel with the first-fluid inlet header 52 and is located about the top head of the pressure vessel. The outlet tubes 58 enter the first-fluid outlet header along its opposing legs. The tube arrangement in FIG. 2 shows the patterns in which the outlet tubes are disposed from the point at which they pick up from the helically coiled tubes 40 to their connection to the first-fluid outlet header 60. This arrangement is also typical for the inlet tubes 54 which are disposed between the first-fluid inlet header 52 and the helically coiled tubes 40.

A second-fluid inlet connection 62 is arranged in the top of the pressure vessel concentric with the vertical axis thereof. A diffuser section 64, connected at its upper end to the second-fluid inlet connection 62, extends vertically downward to a point closely superjacent the conduit 32. The diffuser section 64 is circular in cross-section and diverges downwardly so that as much pressure energy as possible is regained before the fluid discharges from the diffuser section. A deflector 66 is located across the upper end of the conduit and provides a seal therefor. The deflector is located immediately below the diffuser and distributes the flow therefrom equally into the open space 36 which forms an inlet plenum chamber for the second-fluid.

A plate seal 68 is provided at the lower end of the conduit 32 to prevent leakage of the second-fluid into that space. The open space 38 between the lower end of the conduit 32 and the lower head of the container 18 provides a plenum chamber to receive the second-fluid after it flows over the helically coiled tubes. A second-fluid outlet pipe 70 is in communication with the lower open space 38. The outlet pipe 70 which supports the container is connected at its upper end to the bottom of the container and extends downwardly to and through the bottom head 16 of the pressure vessel 10. This outlet pipe 70 is located directly below the conduit 32 and is concentrically arranged with respect to the vertical axis of the pressure vessel. The connection between the outlet pipe and the pressure vessel is shaped to provide a thermal sleeve-like construction which avoids undue thermal stressing of the wall forming the pressure vessel bottom head.

A support skirt 72 is integrally attached to the outside of the shell 12 of the pressure vessel 10 at a point just above the bottom elliptical head 16. The skirt is formed by a vertically arranged cylinder which extends downwardly from its connection to the pressure vessel to a point below the bottom of the pressure vessel and is there connected to a support skirt flange 74.

A gas inlet connection 76 is located in the pressure vessel shell 12 at a point above the top of the container 18 to supply inert gases to the gas space 30 which completely encloses the container. At the base of the pressure vessel a connection 77 is arranged through the bottom head 16 to permit drainage of sodium condensate vapor from the gas space. A gas inlet line 78 extends upwardly within the second-fluid outlet pipe 70 from a point outside the pressure vessel to supply inert gas to the conduit 32. The inlet line 78 passes through the plate 68 at the bottom of the conduit and terminates at that point. A vent 80 having its inlet end arranged at the top of the conduit 32 extends vertically downward within the conduit through the plate 68 and then out through the heating fluid outlet pipe 70 to a point outside of the pressure vessel.

A number of flanged access ports 82 are arranged in the pressure vessel shells and the container 18 to permit inspection and maintenance of the helically coiled tubes within the container.

Four blowout nozzles with diaphragms 84 are situated in the top head 14 of the pressure vessel 10 to provide relief for the system within the pressure vessel in the event excessive pressures are developed due to the interaction of the first- and second-fluids.

To provide a better understanding of the present invention a description of the method of operation of a preferred embodiment of the invention now follows. In this preferred embodiment the first-fluid, which is to be vaporized as it flows within helically coiled tubes, is water and the second-fluid, which acts as the heating medium, is heated liquid sodium.

The liquid sodium enters the pressure vessel 10 through the second-fluid inlet connection 62 and flows downwardly through the diffuser section 64. As the liquid sodium flows from the diffuser section it is evenly distributed into the open space 36 or inlet plenum chamber by means of the deflector 66. The height of sodium in the inlet plenum chamber is controlled by pressurizing the inert gas in the gas space 30 about the container 18. In this way a normal level 86 of sodium, see FIG. 1, is maintained within the inlet plenum chamber which permits a surge of sodium to be contained within the chamber and avoids, in the event of a surge, having the heated liquid sodium coming in contact with the walls of the pressure vessel.

From the inlet plenum chamber the sodium flows downwardly through the annular shaped chamber 34 about the helically coiled tubes 40 in heat transfer relationship therewith. Spacing of the individual tubes within the circular layers promotes uniform distribution of sodium flow over the tubes. The hangers 42 which provide support for the tubes are arranged in parallel relationship with the flow of the sodium and do not impede its flow.

At the lower end of the annular shaped chamber the sodium flows into the lower open space 38, or outlet plenum chamber, located immediately below the lower end of the helically coiled tubes. From here the sodium passes through the second-fluid outlet pipe 70 to a point exterior of the pressure vessel.

The water to be vaporized enters the U-shaped inlet header 52, from a source not shown, thence through the inlet tubes 54 to the lower end of the bundle of helically coiled tubes. As was described previously, to provide flow stability the inlet tubes are of smaller diameter than the tubes in the heat absorbing zone. The water after it enters these tubes flows in heat exchange relationship with the heated liquid sodium, absorbing heat so that it may become vaporized or even superheated before it reaches the upper ends of the helically coiled tubes. The vapor flows from the upper ends of the heat absorbing tubes to the vapor outlet header 60, thence to point of use.

In the present invention the heating fluid flowing through the vapor generator is kept within the container. The container is spaced on all sides from the pressure vessel and in this way the high temperature heating fluid which flows through the container does not come in contact with the pressure vessel walls and thereby the possibility of excessive temperature gradients being developed in the shell are avoided.

In addition, the novel arrangement of the heat exchanger of the present invention precludes the use of double tubes and heavy tube sheets. Double tubes are not necessary because the inert gas space which completely surrounds the container provides an adequate safeguard against any interaction which might occur between a liquid metal heating fluid and water. Heavy tube sheets are eliminated by the arrangement of the helical tube coils in association with the novel method provided for the introduction of the heating fluid and for its passage through the vapor generator. The invention thus provides a more commercially attractive vapor generating unit than those heretofore offered.

The helically coiled tube bundle arrangement serves several important functions. First, the configuration of the bundle minimizes the flow stratification, which in previous liquid metal vapor generators, resulted in tube temperature unbalances. Secondly, the closely spaced, concentric tube coils permit installing the maximum length of tubes within a given vertical height. Further, since all the tubes are of substantially equal length, essentially equal heating of the fluid passing therethrough is accomplished. Moreover, provision for the differential expansion occurring between the tube coils is compensated for in the support structure.

This invention has been described using heated liquid sodium as the heating fluid and water as the fluid to be vaporized. Persons experienced in the art, however, will realize that other heating fluids as well as other liquid metals may be used in place of the sodium. Further, fluids other than water may be used as the fluid to be vaporized.

While in accordance with the provisions of the statutes we have illustrated and described herein the best form of the invention now known to us, those skilled in the art will understand that changes may be made in the form of the apparatus disclosed without departing from the spirit of the invention covered by the claims, and that certain features of the invention may sometimes be used to advantage without a corresponding use of other features.

What is claimed:

1. A heat exchange apparatus comprising a vertically arranged pressure vessel of circular cross-section closed at both ends, a vertically extending container formed by relatively thin walls as compared with said pressure vessel walls, said container arranged within and spaced from said pressure vessel to form a gas space completely enveloping the container, said container open at its top to said gas space, a conduit located in said pressure vessel concentric with the central axis thereof and positioned within said container, said conduit having a relatively small diameter compared with said container, said conduit in combination with said container forming an annular flow space therebetween, a bundle of helically wound closely spaced heat exchange tubes arranged within said annular flow space and coiled about said conduit for the flow therethrough of a heat transfer fluid, inlet means for supplying the heat transfer fluid to said bundle of tubes, outlet means for removing the heat transfer fluid from said bundle of tubes, means for supplying a heat transfer liquid to said annular flow space for passage therethrough out of contact with said pressure vessel and in indirect heat exchange relationship with said heat transfer fluid, the heat transfer liquid within said container forming a liquid level therein spaced below the top of the container and substantially covering the bundle of heat exchange tubes and means for supplying gas under pressure to said gas space so that the gas envelops said container and is in communication with the heat transfer liquid at its liquid level within the container whereby the gas acts as a separating medium between said container and pressure vessel while pressurizing the liquid level of said heat transfer liquid within said container.

2. A heat exchange apparatus comprising walls forming a vertically elongated pressure vessel of circular cross-section closed at both ends, a cylindrically shaped vertically extending container open at the top formed by relatively thin side and bottom walls as compared with said pressure vessel walls, said container arranged within said pressure vessel concentric with the central axis thereof and spaced from the walls thereof to form a continuous gas space completely enveloping the container, said container open at its top to said gas space, a conduit of circular cross-section located in said pressure vessel concentric with the central axis thereof and positioned within said container, said conduit having a relatively small diameter compared with said container, said conduit in combination with said container forming an annular flow space therebetween, a bundle of helically wound closely spaced heat exchange tubes arranged within said annular flow space and coiled about and extending for approximately the length of said conduit for the flow therethrough of a heat transfer fluid, each of said tubes having a correlated pitch and diameter whereby each tube is of equal length, inlet means for supplying the heat transfer fluid to the lower ends of said bundle of tubes, outlet means for removing the heat transfer fluid from the upper end of said bundle of tubes, means for supplying to said annular flow space a heat transfer liquid for passage therethrough out of contact with said pressure vessel and in indirect heat exchange relationship with said heat transfer fluid, the heat transfer liquid within said container forming a liquid level therein spaced below the top of the container and substantially covering the bundle of heat exchange tubes means for removing the heat transfer liquid from said annular flow space, and means for supplying gas under pressure to said gas space so that the gas envelops said container and is in communication with the heat taransfer liquid at its liquid level within the container whereby the gas acts as a separating medium between said container and pressure vessel while pressurizing the liquid level of said heat transfer liquid within said cotnainer.

3. A heat exchange apparatus comprising walls forming a vertically elongated pressure vessel of circular cross-section closed at both ends, a cylindrically shaped vertically extending container open at the top formed by relatively thin side and bottom walls compared with said pressure vessel walls, said container arranged within said pressure vessel with the side walls of the container closely spaced from the pressure vessel walls and the top and bottom of the container spaced a relatively greater distance from the top and bottom of said pressure vessel thereby forming a continuous gas space completely enveloping said container, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, the upper end of said conduit located below the top of said container, the lower end of said conduit located above the bottom of said container, a bundle of helically wound closely spaced heat exchange tubes arranged within said annular flow space and coiled about and extending for approximately the length of said conduit for the flow therethrough of a heat transfer fluid, each of said tubes having a correlated pitch and diameter whereby each tube is of equal length, inlet means for supplying the heat transfer fluid to the lower ends of said bundle of tubes, outlet means for removing the heat transfer fluid from the upper end of said bundle of tubes, inlet means for supplying a heat transfer liquid to said annular flow space and outlet means to remove the heat transfer liquid from said annular flow space after its passage therethrough out of contact with said pressure vessel and in indirect heat exchange relationship with said heat transfer fluid, the heat transfer liquid within said container forming a liquid level therein spaced below the top of the container and substantially covering the bundle of heat exchange tubes first gas inlet means for supplying inert gas under pressure to said gas sapce so that the gas envelops said container and is in communication with the heat transfer liquid at its liquid level within the container whereby the gas acts as a separating medium between said container and pressure vessel while pressurizing the liquid level of said heat transfer liquid within said container and gas inlet means for supplying gas to said conduit.

4. A vapor generator comprising walls forming a vertically arranged pressure vessel of circular cross-section, a cylindrically shaped vertically extending container open at the top formed by relatively thin side and bottom walls as compared with said pressure vessel walls, said container arranged within said pressure vessel with the side walls of the container closely spaced from the pressure vessel walls and the top and bottom of the container spaced a relatively greater distance from the top and bottom of said pressure vessel thereby forming a continuous gas space completely enveloping said container, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, the upper end of said conduit located below the top of said container, the lower end of said conduit located above the bottom of said container, a bundle of closely spaced vapor generating tubes arranged within said annular flow space and helically wound about and extending for approximately the length of said conduit, said bundle of tubes arranged in a number of concentrically arranged circular layers, each of said tubes disposed within one of said circular layers and having a correlated pitch and diameter whereby each tube is of equal length, means to support said tubes within said pressure vessel, inlet means for supplying a liquid to be vaporized to the lower ends of said bundle of tubes, outlet means for removing the vaporized liquid from the upper end of said bundle of tubes, inlet means located at the top of said container for supplying a heating liquid to said annular flow space for passage therethrough out of contact with said pressure vessel and in indirect heat exchange relationship with the liquid to be vaporized, outlet means located at the bottom of said container for removing the heating liquid therefrom, the heating liquid within said container forming a liquid level therein spaced below the top of the container and substantially covering the bundle of vapor generating tubes, first gas inlet means for supplying inert gas under pressure to said gas space so that the gas envelops said container and is in communication with the heating liquid at its liquid level within the container whereby the gas acts as a separating medium between said container and pressure vessel while pressurizing the liquid level of said heating liquid within said container, and second gas inlet means for supplying gas to said conduit.

5. A vapor generator comprising walls forming a vertically arranged pressure vessel having closed upper and lower heads, a cylindrically shaped vertically extending container open at the top formed by relatively thin side and bottom walls as compared with said pressure vessel walls, said container arranged within said pressure vessel with the side walls of the container closely spaced from the pressure vessel walls and the top and bottom of the container spaced a considerably greater distance from the top and bottom of said pressure vessel thereby forming a continuous gas space completely enveloping said container, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, said upper end located below the top of said container, said lower end located above the bottom of said container, a transverse plate providing a closure for the lower end of said conduit, a bundle of closely spaced vapor generating tubes arranged within said annular flow space and helically wound about and extending for approximately the length of said conduit, said bundle of tubes arranged in a number of concentrically arranged circular layers, each of said tubes disposed within one of said circular layers and having a correlated pitch and diameter whereby each tube is of equal length, means to support said tubes within said pressure vessel, a liquid inlet header arranged exteriorly about the lower portion of said pressure vessel, liquid inlet tubes connecting said liquid inlet header with the lower ends of said vapor generating tubes, a vapor outlet header arranged exteriorly about the upper portion of said pressure vessel, vapor outlet tubes connecting the upper end of said vapor generating tubes with said vapor outlet header, a heating liquid inlet means located in the upper head of said pressure vessel, a vertically arranged diffuser extending downwardly from said heating liquid inlet means to a point below the top of said container and above said conduit, a deflector positioned across the top of said conduit, said deflector evenly distributing the heating liquid from said diffuser to said annular flow space, heating liquid outlet means extending from the bottom of said container to the bottom head of said pressure vessel, the heating liquid within said container forming a liquid level therein spaced below the top of the container and substantially covering the bundle of vapor generating tubes, first gas inlet means for supplying inert gas under pressure to said gas space so that the gas envelops said container and is in communication with the heating liquid at its liquid level within the container whereby the gas acts as a separating medium between said container and pressure vessel while pressurizing the liquid level of said heating liquid within said container, and second gas inlet means for supplying gas to said conduit.

6. A liquid metal heated vapor generator comprising walls forming a vertically elongated pressure vessel having closed upper and lower heads, a cylindrically shaped vertically extending container open at the top formed by relatively thin side and bottom walls as compared with said pressure vessel walls, said container arranged within said pressure vessel with the side walls of the container closely spaced from the pressure vessel walls and the top and bottom of the container spaced a considerably greater distance from the top and bottom of said pressure vessel thereby forming a continuous gas space completely enveloping said container, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, the upper end of said conduit located below the top of said container, the lower end of said conduit located above the bottom of said container, a transverse plate providing a closure for the lower end of said conduit, a bundle of closely spaced vapor generating tubes arranged within said annular flow space and helically wound about and extending for approximately the length of said conduit, said bundle of tubes arranged in a number of concentrically arranged circular layers, each of said tubes disposed within one of said circular layers and having a correlated pitch and diameter whereby each tube is of equal length, means to support said tubes within said pressure vessel, a liquid inlet header arranged exteriorly about the lower portion of said pressure vessel, liquid inlet tubes connecting said liquid inlet header with the lower ends of said vapor generating tubes, a vapor outlet header arranged exteriorly about the upper portion of said pressure vessel, vapor outlet tubes connecting the upper end of said vapor generating tubes with said vapor outlet header, liquid metal inlet means located in the upper portion of said pressure vessel for supplying heated liquid metal to the top of said annular flow space for passage therethrough to vaporize the liquid flowing through said vapor generating tubes, and liquid metal outlet means located in the lower portion of said pressure vessel for removing the liquid metal from said annular flow space, the liquid metal within said container forming a liquid level therein spaced below the top of the container and substantially covering the bundle of vapor generating tubes, and means for supplying inert gas under pressure to said gas space so that the gas envelops said container and is in communication with the heated liquid metal at its liquid level within the container whereby the gas acts as a separating medium between said container and pressure vessel while pressurizing the liquid level of said heated liquid metal within said container.

7. A liquid metal heated vapor generator comprising walls forming a vertically elongated pressure vessel having closed upper and lower heads, a cylindrically shaped vertically extending container open at the top formed by relatively thin side and bottom walls as compared with said pressure vessel walls, said container arranged within said pressure vessel with the side walls of the container closely spaced from the pressure vessel walls and the top and bottom of the container spaced a considerably greater distance from the top and bottom of said pressure vessel thereby forming a continuous gas space completely enveloping said container, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, the upper end of said conduit located below the top of said container, the lower end of said conduit located above the bottom of said container, a transverse plate providing a closure for the lower end of said conduit, a vertically disposed bundle of closely spaced vapor generating tubes arranged within said annular flow space and helically wound about and extending for approximately the length of said conduit, said bundle of tubes arranged in a number of concentrically arranged circular layers, each of said tubes disposed within one of said circular layers and having correlated pitch and diameter whereby each tube is of equal length, means to support said tubes within said pressure vessel, a liquid inlet header arranged exteriorly about the lower portion of said pressure vessel, liquid inlet tubes connecting said liquid inlet header with the lower end of said vapor generating tubes, a vapor outlet header arranged exteriorly about the upper portion of said pressure vessel, vapor outlet tubes connecting the upper end of said vapor generating tubes with said vapor outlet header, a liquid metal inlet located in the upper head of said pressure vessel, a liquid metal plenum chamber formed within said conatiner and located between a transverse plane across the top of said conduit and a transverse plane across the top of said container, a vertically arranged diffuser concentrically arranged about the central axis of said pressure vessel extending downwardly from said liquid metal inlet into said liquid metal plenum chamber for supplying liquid metal thereto, said diffuser formed by a frusto-conically shaped pipe having its greatest diameter at the lower end thereof, a deflector positioned across the top of said conduit to distribute the liquid metal evenly to said annular flow space, a liquid metal outlet extending from the bottom of said container to the bottom of said pressure vessel, said liquid metal outlet integrally attached to said pressure vessel and supplying the support for said container, the liquid metal within said container forming a liquid level therein spaced below the top of the container and substantially covering the bundle of vapor generating tubes, first gas inlet means for supplying inert gas under pressure to said gas space so that the gas envelops said container and is in communication with the liquid metal at its liquid level within the container whereby the gas acts as a separating medium between said container and pressure vessel while pressurizing the liquid level of said liquid metal within said container, and second gas inlet means for supplying gas to said conduit.

8. A liquid metal heated once-through vapor generator comprising walls forming a vertically elongated pressure vessel having closed upper and lower heads, a cylindrically shaped vertically extending container open at the top formed by relatively thin side and bottom walls as compared with said pressure vessel walls, said container arranged within said pressure vessel with the side walls of the container closely spaced from the pressure vessel walls and the top and bottom of the container spaced a considerably greater distance from the top and bottom of said pressure vessel thereby forming a continuous gas space completely enveloping said container, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, the upper end of said conduit located below the top of said container, the lower end of said conduit located above the bottom of said container, a transverse plate providing a closure for the lower end of said conduit, a vertically disposed bundle of closely spaced vapor generating tubes arranged within said annular flow space and helically wound about and extending for approximately the length of said conduit, said bundle of tubes arranged in a number of concentrically arranged circular layers, each of said tubes disposed within one of said circular layers and having a correlated pitch and diameter whereby each tube is of equal length, upper and lower carrying members extending radially from the outer wall of said conduit to the inner wall of said container, hanger bars extending between and connecting said upper and lower carrying members, said hanger bars provided to support said vapor generating tubes, a liquid inlet header arranged exteriorly about the lower portion of said pressure vessel, liquid inlet tubes connecting said liquid inlet header with the lower ends of said vapor generating tubes, a vapor outlet header arranged exteriorly about the upper portion of said pressure vessel, vapor outlet tubes connecting the upper end of said vapor generating tubes with said vapor outlet header, a liquid metal inlet located in the upper head of said pressure vessel, a liquid metal plenum chamber formed within said container and located between a transverse plane across the top of said conduit and a transverse plane across the top of said container, a vertically arranged diffuser concentrically positioned about the central axis of said pressure vessel and extending downwardly from said liquid metal inlet into said liquid metal plenum chamber for supplying liquid metal thereto, said diffuser formed by a frusto-conically shaped pipe having its greatest diameter at the lower end thereof, a deflector positioned across the top of said conduit to distribute the liquid metal evenly to said annular flow space, a liquid metal outlet extending from the bottom of said container to the bottom of said pressure vessel, said liquid metal outlet integrally attached to said pressure vessel and supplying the support for said container, the liquid metal within said container forming a liquid level therein spaced below the top of the container and substantially covering the bundle of vapor generating tubes, first gas inlet means for supplying inert gas under pressure to said gas space so that the gas envelops said container and is in communication with the liquid metal at its liquid level within the container whereby the gas acts as a separating medium between said container and pressure vessel while pressurizing the liquid level of said liquid metal within said container, second gas inlet means for supplying gas to said conduit, and first drain means for said gas space and second drain means for said conduit.

9. A liquid metal heated once-through vapor generator comprising walls forming a vertically elongated pressure vessel having closed upper and lower heads, a cylindrically shaped vertically extending container open at the top formed by relatively thin side and bottom walls as compared with said pressure vessel walls, said container arranged within said pressure vessel with the side walls of the container closely spaced from the pressure vessel walls and the top and bottom of the container spaced a considerably greater distance from the top and bottom of said pressure vessel, a continuous gas space completely enveloping the container formed between said container and said pressure vessel, a conduit of circular cross-section having an upper and a lower end located in said pressure vessel concentric with the central axis thereof and positioned within said container, said conduit having a relatively small diameter compared with said container, said conduit in combination with said container forming an annular flow space therebetween, the upper end of said conduit located below the top of said container, the lower end of said conduit located above the bottom of said container, a transverse plate providing a closure for the lower end of said conduit, a vertically disposed bundle of closely spaced vapor generating tubes arranged within said annular flow space and helically wound about and extending for approximately the length of said conduit, said bundle of tubes arranged in a number of concentrically arranged circular planes, each of said tubes disposed within one of said circular planes and having a corresponding pitch and diameter whereby each tube is of equal length, upper and lower carrying members located immediately above and below said bundle of tubes and extending radially from the outer wall of said conduit to the inner wall of said container, vertically arranged hanger bars extending between and connecting said upper and lower carrying members, said hanger bars having one edge provided with alternately scalloped and straight portions, the scalloped portions thereof arranged to support every other coil of each of said vapor generating tubes, vertically extending support members attached at one end to the upper head of said pressure vessel and at the opposite end to said upper carrying members, a U-shaped liquid inlet header located exteriorly of and about the lower portion of said pressure vessel and arranged in a plane normal to the vertical axis thereof, liquid inlet tubes connecting said liquid inlet header with the lower ends of said vapor generating tubes, said liquid inlet tubes having a smaller interior diameter than said vapor generating tubes, a reducer fitting located in the bottom of said container and joining said liquid inlet and vapor generating tubes, a U-shaped vapor outlet header located exteriorly of and about the upper portion of said pressure vessel and arranged in a plane normal to the vertical axis thereof, vapor outlet tubes connecting the upper end of said vapor generating tubes with said vapor outlet header, a liquid metal inlet located in the upper head of said pressure vessel, a liquid metal plenum chamber formed within said container and located between a transverse plane across the top of said conduit and a transverse plane across the top of said container, a vertically arranged diffuser concentrically positioned about the central axis of said pressure vessel and extending downwardly from said liquid metal inlet into said liquid metal plenum chamber for supplying liquid metal thereto, said diffuser formed by a frusto-conically shaped pipe having its greatest diameter at the lower end thereof, a deflector positioned across the top of said conduit to distribute the liquid metal evenly to said annular flow space, a liquid metal outlet extending from the bottom of said container to the bottom of said pressure vessel, said liquid metal outlet integrally attached to said pressure vessel and supplying the support for said container, the liquid metal within said container forming a liquid level therein spaced below the top of the container and substantially covering the bundle of vapor generating tubes, first gas inlet means for supplying inert gas under pressure to said gas space so that the gas envelops said container and is in communication with the liquid metal at its liquid level within the container whereby the gas acts as a separating medium between said container and pressure vessel while pressurizing the liquid level of said liquid metal within said container, second gas inlet means for supplying inert gas to said conduit, drain means for said gas space, vent drain means for said conduit, and a number of blowout nozzles situated in the upper head of said pressure vessel.

10. A heat exchange apparatus comprising a vertically arranged pressure vessel of circular cross-section closed at both ends, walls forming a vertically extending container open at its top and disposed within and spaced from said pressure vessel to form a gas space enveloping the container, a bundle of closely spaced heat exchange tubes arranged within said container, inlet means for supplying a heat transfer fluid to said bundle of tubes, outlet means for removing said heat transfer fluid from said bundle of tubes, means for supplying a heat transfer liquid to said container for passage therethrough out of contact with said pressure vessel and in indirect heat exchange relationship with said heat transfer fluid, the heat transfer liquid within said container forming a liquid level therein spaced below the top of the container and substantially covering the bundle of heat exchange tubes, and means for supplying gas under pressure to said gas space so that the gas envelops said container and is in communication with the heat transfer liquid at its liquid level within the container whereby the gas acts as a separating medium between said container and pressure vessel while pressurizing the liquid level of said heat transfer liquid within said container.

References Cited in the file of this patent

UNITED STATES PATENTS

| | | |
|---|---|---|
| 217,923 | Braden | July 29, 1879 |
| 747,943 | Condict | Dec. 29, 1903 |
| 1,580,974 | Rembold | Apr. 13, 1926 |
| 1,884,778 | Lucke et al. | Oct. 25, 1932 |
| 2,185,595 | Kleinschmidt | Jan. 2, 1940 |
| 2,641,233 | Hemenway et al. | June 9, 1953 |
| 2,920,609 | Iager et al. | Jan. 12, 1960 |

FOREIGN PATENTS

| | | |
|---|---|---|
| 1,164,761 | France | May 19, 1958 |